United States Patent
Buchwitz et al.

(10) Patent No.: US 10,836,424 B2
(45) Date of Patent: Nov. 17, 2020

(54) WHEEL STEERING APPARATUS TO GENERATE POSITIVE REAR ACKERMANN

(71) Applicant: Ford Global Technologies, LLC, Dearborn, MI (US)

(72) Inventors: Joe L Buchwitz, Huntington Woods, MI (US); James Adam Drozdowski, Chelsea, MI (US); Geoffrey Lawrence Gordon, Novi, MI (US); John Wesley Stanley, Belleville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 150 days.

(21) Appl. No.: 16/001,115

(22) Filed: Jun. 6, 2018

(65) Prior Publication Data
US 2019/0375453 A1 Dec. 12, 2019

(51) Int. Cl.
*B62D 7/14* (2006.01)
*B62D 7/16* (2006.01)
*B60G 3/20* (2006.01)
*B62D 7/20* (2006.01)

(52) U.S. Cl.
CPC ............ *B62D 7/146* (2013.01); *B60G 3/202* (2013.01); *B62D 7/166* (2013.01); *B62D 7/20* (2013.01); *B60G 2200/44* (2013.01)

(58) Field of Classification Search
CPC .......... B62D 7/146; B62D 7/166; B62D 7/20; B60G 3/202; B60G 2200/44
See application file for complete search history.

(56) References Cited

U.S. PATENT DOCUMENTS

| | | | | |
|---|---|---|---|---|
| 3,527,316 A | * | 9/1970 | Jones, Jr. ............ | B60B 35/1018 180/437 |
| 5,921,343 A | * | 7/1999 | Yamakaji ................. | B62D 9/00 180/253 |
| 6,202,781 B1 | * | 3/2001 | Ima ........................ | B60K 17/30 180/252 |
| 6,411,876 B1 | | 6/2002 | Badenoch | |
| 6,510,917 B2 | | 1/2003 | Cole | |
| 7,077,234 B2 | * | 7/2006 | Klais ........................ | B62D 3/12 180/428 |
| 8,201,656 B2 | * | 6/2012 | Archer ..................... | B62D 3/12 180/417 |
| 8,733,771 B2 | * | 5/2014 | Johnson ................. | B60G 9/003 280/124.106 |
| 10,099,530 B2 | * | 10/2018 | Grimes ............. | B60G 21/0553 |

(Continued)

FOREIGN PATENT DOCUMENTS

| | | |
|---|---|---|
| CN | 105857387 | 8/2016 |
| DE | 10142599 | 4/2003 |

(Continued)

*Primary Examiner* — Ruth Ilan
*Assistant Examiner* — Marlon A Arce
(74) *Attorney, Agent, or Firm* — Raymond L. Coppiellie; Hanley, Flight & Zimmerman, LLC

(57) ABSTRACT

Vehicle suspension systems are described herein. An example wheel steering apparatus includes a steering actuator to couple to a rear axle, a tie rod, and a transfer link to couple the steering actuator and the tie rod. The steering actuator is positioned on a first side of a first longitudinal axis of the rear axle and the tie rod positioned on a second side of the first longitudinal axis of the rear axle opposite the first side.

20 Claims, 9 Drawing Sheets

(56) References Cited

U.S. PATENT DOCUMENTS

| | | | | |
|---|---|---|---|---|
| 2006/0157948 A1* | 7/2006 | Genz | ............... | B62D 7/142 |
| | | | | 280/91.1 |
| 2008/0209880 A1* | 9/2008 | Derby | ............ | A01D 34/006 |
| | | | | 56/10.8 |
| 2017/0282970 A1 | 10/2017 | Yanez | | |

FOREIGN PATENT DOCUMENTS

| | | |
|---|---|---|
| EP | 0722879 | 7/1996 |
| EP | 2141062 | 1/2010 |

\* cited by examiner

WHEEL STEERING APPARATUS TO GENERATE POSITIVE REAR ACKERMANN

FIELD OF THE DISCLOSURE

This disclosure relates generally to vehicle suspensions and, more particularly, to rear wheel steering apparatus to generate positive rear Ackermann.

BACKGROUND

Ackermann steering geometry enables mechanically linked steerable wheels to move together simultaneously during turning and steering movements. However, in some instances, space constraints of a vehicle suspension prevent desired Ackermann geometry between steering components, thereby resulting in less than desired Ackermann (e.g., negative Ackermann) and reducing vehicle maneuverability, handling and/or performance. For example, solid axles with rear wheel steering capability often generate negative rear wheel Ackermann due to various components (e.g., driveshaft package, brake package, etc.) that interfere with a desired mounting location of rear wheel steering components.

Figure 1:
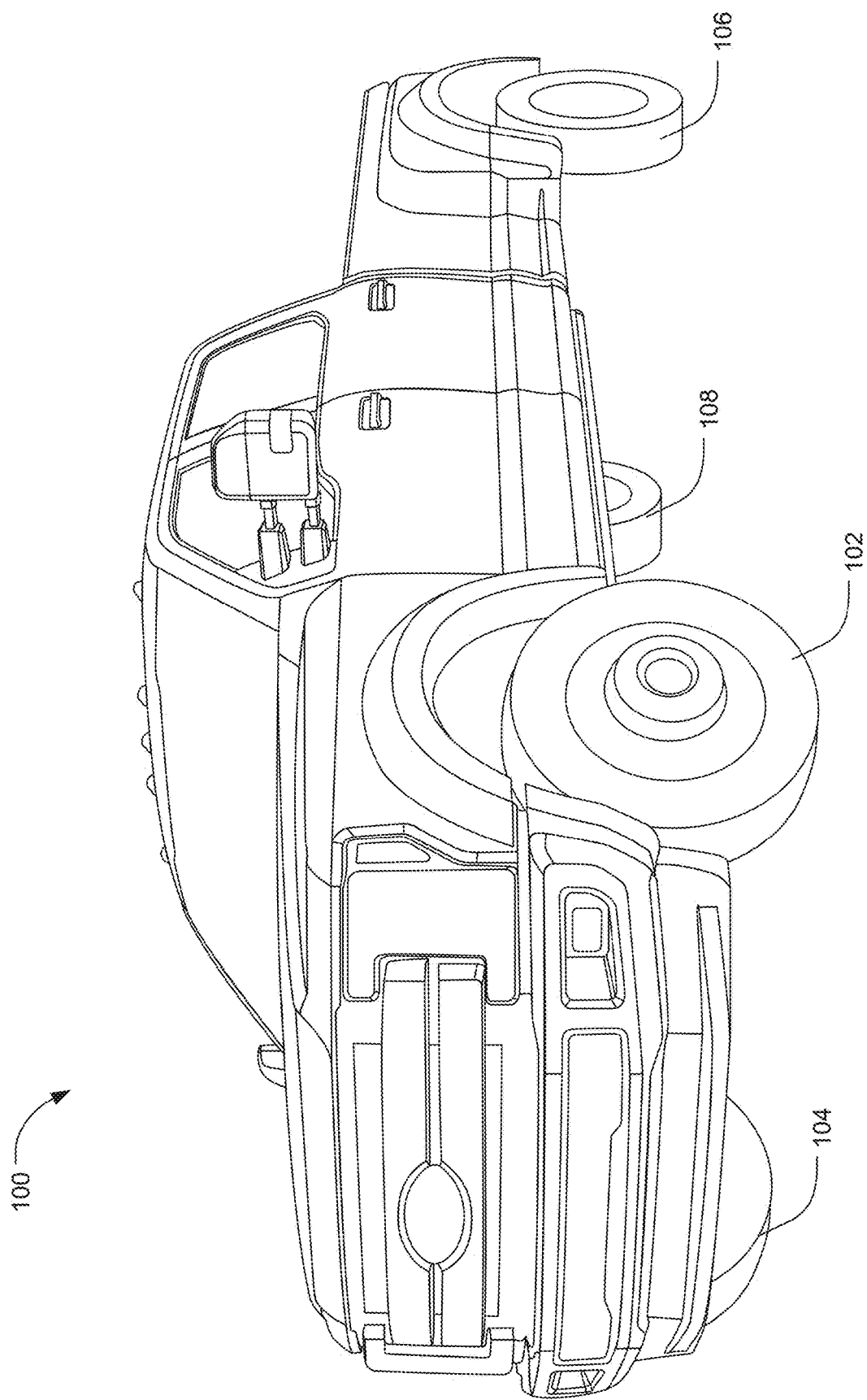
FIG. 1 represents an example vehicle that may be implemented with an example wheel steering apparatus in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Stating that a part is coupled or connected to another part indicates that the parts are joined directly or through one or more intervening parts. Thus, physical contact is not required for two parts to be coupled or connected.

DETAILED DESCRIPTION

Ackerman geometry prevents tires of a vehicle from turning about different points during a vehicle turning event. When the tires of a vehicle turn relative to different points (e.g., different center points relative to a radius of curvature of a turning path of the vehicle), the wheels fight each other to force the vehicle to turn about the point about which each tire is turning. As a result, one or more of the tires drag in a direction slightly different from that in which the vehicle is steered, causing the tires to scrub against the ground and wear. Solid axle rear suspension systems typically include non-steerable wheels. For non-steerable rear wheel suspensions, Ackerman geometry is configured such that each of the front wheels and the rear wheels turn about a common turning point during a turning event.

To improve handling and/or vehicle performance, some vehicles utilize all-wheel steering functionality. Rear wheel steering enables rear wheels of a vehicle to provide steering in addition to front wheels to improve vehicle handling, vehicle maneuverability, and/or performance. Implementing a four-wheel steering system (e.g., front and rear wheel steerability) requires Ackermann accommodation for all four wheels to improve vehicle maneuverability (e.g., avoid or reduce tire scrubbing during turning).

Positive Ackermann prevents or reduces tire scrubbing during turning while negative Ackermann does not reduce (e.g., increases) tire scrubbing. Thus, positive Ackermann is typically desired. For example, positive Ackermann allows the front wheels and the rear wheels of a four-wheel steer vehicle to rotate around a common center point (e.g., located between a front axle and a rear axle) during turning to reduce (e.g., minimize or eliminate) tire scrubbing and/or tire wear and/or improve vehicle handling and/or maneuverability. Typically, 100 percent Ackermann is not desired, due to trade-offs relating to higher speed handling and/or steering. However, a moderate level of positive Ackermann is desired to reduce tire scrubbing and/or tire wear. For example, positive Ackermann of approximately between 40 percent and 60 percent significantly reduces tire scrubbing, tire wear and/or significantly improves vehicle maneuverability, handling and/or other characteristic(s).

Some vehicles employing rear-wheel steering generate negative Ackermann (e.g., negative Ackermann percentages) due to space constraints that prevent desired Ackerman geometry of steering components. In other words, a desired, positive Ackermann geometry cannot be achieved. For example, a driveshaft assembly (e.g., a rear differential housing or casing), a brake package, shock absorbers, and/or other vehicle components associated with a solid rear axle (e.g., a Hotchkiss solid rear axle) may interfere with a desired mounting location of a rear wheel steering apparatus (e.g., a steering actuator and tie rod/knuckle interface). As a result, such a rear suspension assembly can exhibit negative Ackermann. The negative Ackermann can cause excessive tire wear or scrubbing, turn diameter performance degradation, undesirable noise condition(s) and/or reduced vehicle maneuverability and/or performance characteristic(s). For example, negative Ackermann can cause excessive tire scrubbing and/or tire wear during a low-speed turning event, thereby providing unwanted or undesired steering influence degrading comfort and performance to vehicle passengers.

For example, due to Ackermann geometry restrictions, an inner rear wheel may have a steering angle that is less than a steering angle of an outer rear wheel, thereby delivering negative Ackermann during a turning event. Negative Ackermann, for example, may cause a front driver-side wheel and a rear driver-side wheel to rotate about a first common point and may cause a front passenger-side wheel and a rear passenger-side wheel to rotate about a second common point different than the first common point during a turning event (e.g., a left-handed turn).

An example wheel steering apparatus disclosed herein produces positive (e.g., rear) Ackermann for an all-wheel steering vehicle. Specifically, an example wheel steering apparatus disclosed herein may be employed with a solid rear axle (e.g., a Hotchkiss solid rear axle). For example, the example wheel steering apparatus disclosed herein enables rear wheel steering capability while generating positive Ackermann. In some examples, steering apparatus disclosed herein produce approximately between positive 40 percent and positive 60 percent Ackermann. In some examples, an example steering apparatus disclosed herein may be configured to generate less than positive 40 percent Ackermann (e.g., between zero percent and 40 percent (e.g., 30 percent)) or more than positive 60 percent Ackermann (e.g., between 60 percent and 100 percent (e.g., 75 percent)). Additionally, example steering wheel apparatus disclosed herein generate positive or improved Ackermann for vehicles having space constraints.

An example steering apparatus disclosed herein includes a steering actuator (e.g., a steering rack) positioned aft of an axle (and/or differential casing) and a tie rod/knuckle interface positioned forward of the axle. In other words, a longitudinal axis of the steering apparatus is positioned on a first side of a longitudinal axis of the rear axle (e.g., aft of the axle) and a tie rod/knuckle interface is positioned on a second side of the longitudinal axis of the rear axle (e.g., fore of the axle) opposite the first side. To this end, the rear axle is positioned between the steering actuator and the tie rod/knuckle interface. In some examples, the tie rod is positioned such that a longitudinal axis of the tie rod is substantially parallel (e.g., with 10 percent tolerance) relative to a longitudinal axis of the steering actuator and/or the longitudinal axis of the rear axle. To transfer translational motion of the steering actuator to translational motion of the tie rod, an example steering apparatus disclosed herein employs a transfer linkage assembly (e.g., a dual transfer linkage). The linkage assembly enables a tie rod/knuckle interface to be located or positioned forward of a wheel center while the steering actuator is positioned rear of the wheel center to generate positive Ackermann. The linkage assembly disclosed herein employs dual linkages to transfer translational movement of a steering actuator to respective ones of the rear wheels.

FIG. 1 is an example vehicle 100 that can implement the teachings of this disclosure. The vehicle 100 of the illustrated example includes front wheels 102, 104 supported by a front suspension and rear wheels 106, 108 supported by a rear suspension. The front suspension associated with the front wheels 102, 104 provides steerability to the front wheels 102, 104. Likewise, the rear suspension associated with the rear wheels 106, 108 provides steerability to the rear wheels 106, 108. The vehicle 100 may be a body-on-frame construction or unibody construction. In some examples, the vehicle 100 may be a truck as depicted in FIG. 1. The example teachings of this disclosure may be implemented with any type of suspension (e.g., a steerable suspension, a non-steerable suspension) and/or any other types of vehicles (e.g., passenger vehicles, military vehicles, etc.)

Figure 2:
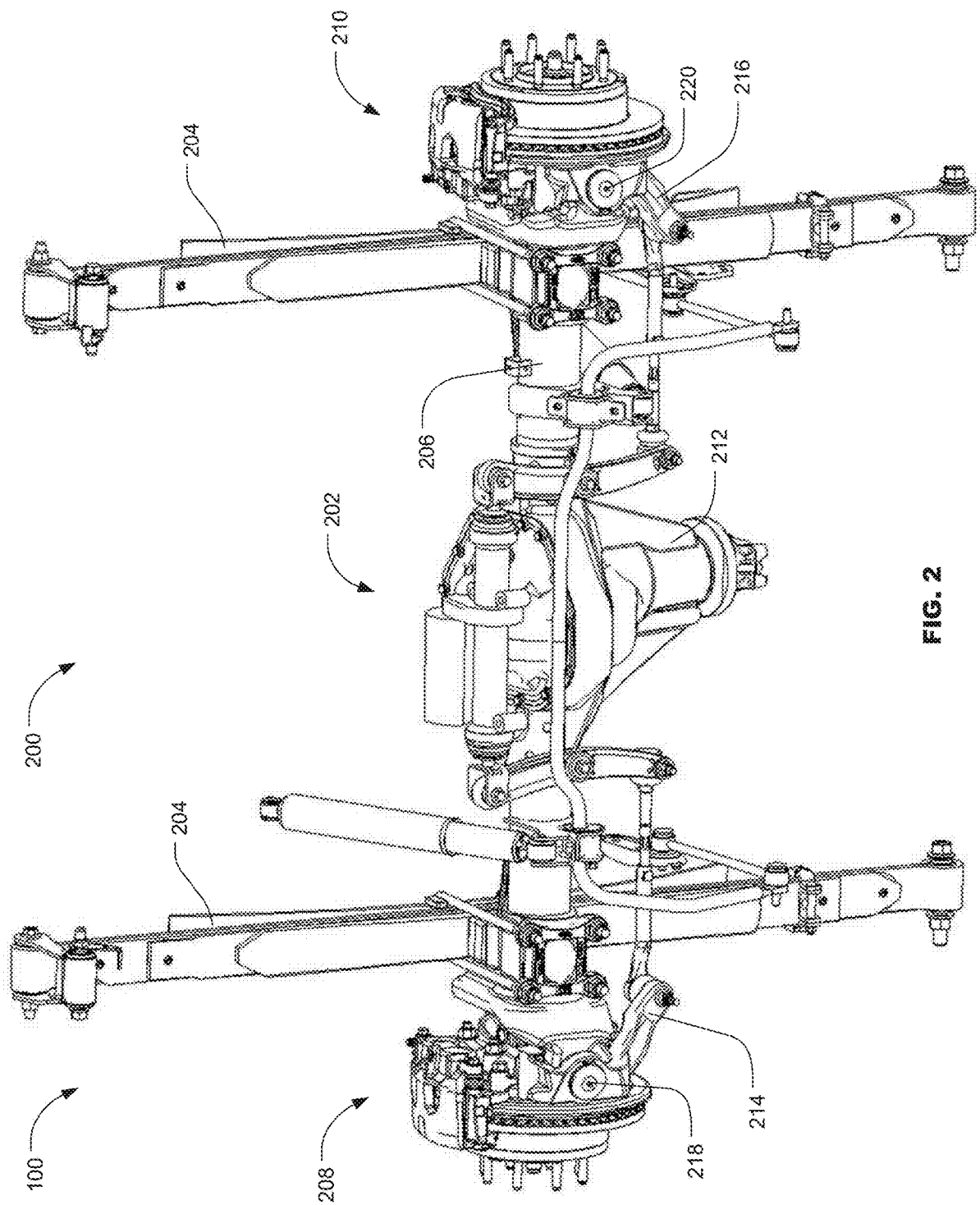
FIG. 2 is a perspective, bottom view of an example vehicle suspension of the example vehicle of FIG. 1 implemented with the example wheel steering apparatus disclosed herein.

FIG. 2 is an example vehicle suspension 200 of the vehicle 100 of FIG. 1 implemented with an example steering apparatus 202 (e.g., a steering assembly) in accordance with teachings of this disclosure. The vehicle suspension 200 of the illustrated example can implement the rear suspension (e.g., a steerable solid axle, leaf spring suspension) associated with the rear wheels 106, 108 (FIG. 1) of the vehicle 100. To provide lateral stability to the vehicle 100 and provide an anti-roll stabilizer, the vehicle suspension 200 of the illustrated example includes a biasing element or leaf spring system 204. For example, the vehicle suspension 200 of the illustrated example is a steerable, solid axle suspension commonly referred to as a Hotchkiss suspension. Although the vehicle suspension 200 is described in connection with the rear suspension or a rear solid axle, leaf spring suspension (e.g., a Hotchkiss suspension), the teachings of the disclosure may also be applied to a front suspension (e.g., of the vehicle 100 associated with the front wheels 102, 104 (FIG. 1), a steer by wire suspension) and/or any other type of suspension(s) (e.g., solid axle suspensions having coil springs, air springs with multi-links and/or any other biasing element, suspensions of a vehicle that support steerable wheel assemblies and/or non-steerable wheel assemblies, etc.).

Figure 4:
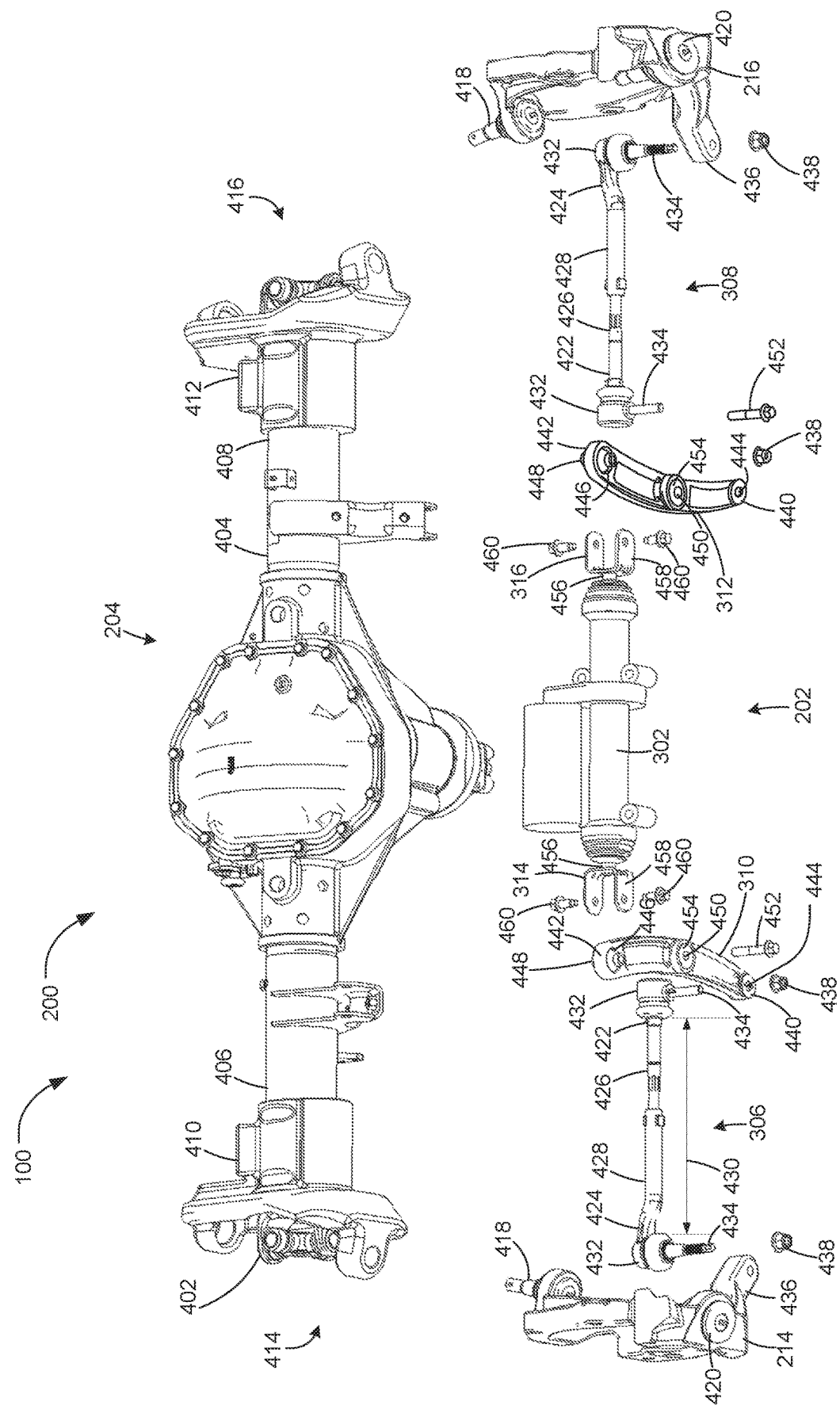
FIG. 4 is an exploded view of the example axle and wheel apparatus assembly of FIG. 3.

Referring to FIG. 2, the vehicle suspension 200 of the illustrated example includes a rear axle 206 (e.g., a steerable, rear axle) to couple the rear wheels 106, 108 (FIG. 1) of the vehicle 100 to a chassis or frame of the vehicle 100. Specifically, the rear axle 206 of the illustrated example includes a wheel assembly 208 (e.g., a first or light-side wheel assembly) to support the rear wheel 106 (FIG. 1) and a wheel assembly 210 (e.g., a second or right-side wheel assembly) to support the rear wheel 108 (FIG. 1). The rear axle 206 of the illustrated example includes an axle shaft 402 (FIG. 4) rotatably coupled within a solid axle housing or axle tube 404 (FIG. 4). The axle shaft 402 rotates within the axle tube 404 to provide rotational movement to the wheel assembly 208 and the wheel assembly 210. A differential 212 (e.g., differential gearing) couples to a powertrain (e.g., via a driveshaft) and distributes driving torque to the rear wheels 106, 108 (FIG. 1) of the vehicle 100 via the axle shaft 402 (FIG. 4) and the respective the wheel assembly 208 and the wheel assembly 210.

The steering apparatus 202 of the illustrated example provides steering capability to the wheel assembly 208 and the wheel assembly 210. To allow for steerability of the wheel assemblies 208, 210 (FIG. 2) and, thus, the rear wheels 106, 108 (FIG. 1) of the vehicle 100, the vehicle suspension 200 of the illustrated example includes left and right-side knuckles 214, 216. Specifically, the left-side wheel assembly 208 pivots or rotates relative to the rear axle 206 via the left-side knuckle 214 about a pivot 218 (e.g., a pivot axis) and the right-side wheel assembly 210 pivots or rotates relative to the rear axle 206 via the right-side knuckle 216 about a pivot 220 (e.g., a pivot axis). In this manner, the knuckle 214 of the illustrated example transfers steering actuation from the steering apparatus 202 to the mounted wheel assembly 208 and the knuckle 216 of the illustrated example transfers steering actuation from the steering apparatus 202 to the mounted wheel assembly 210.

Figure 3:
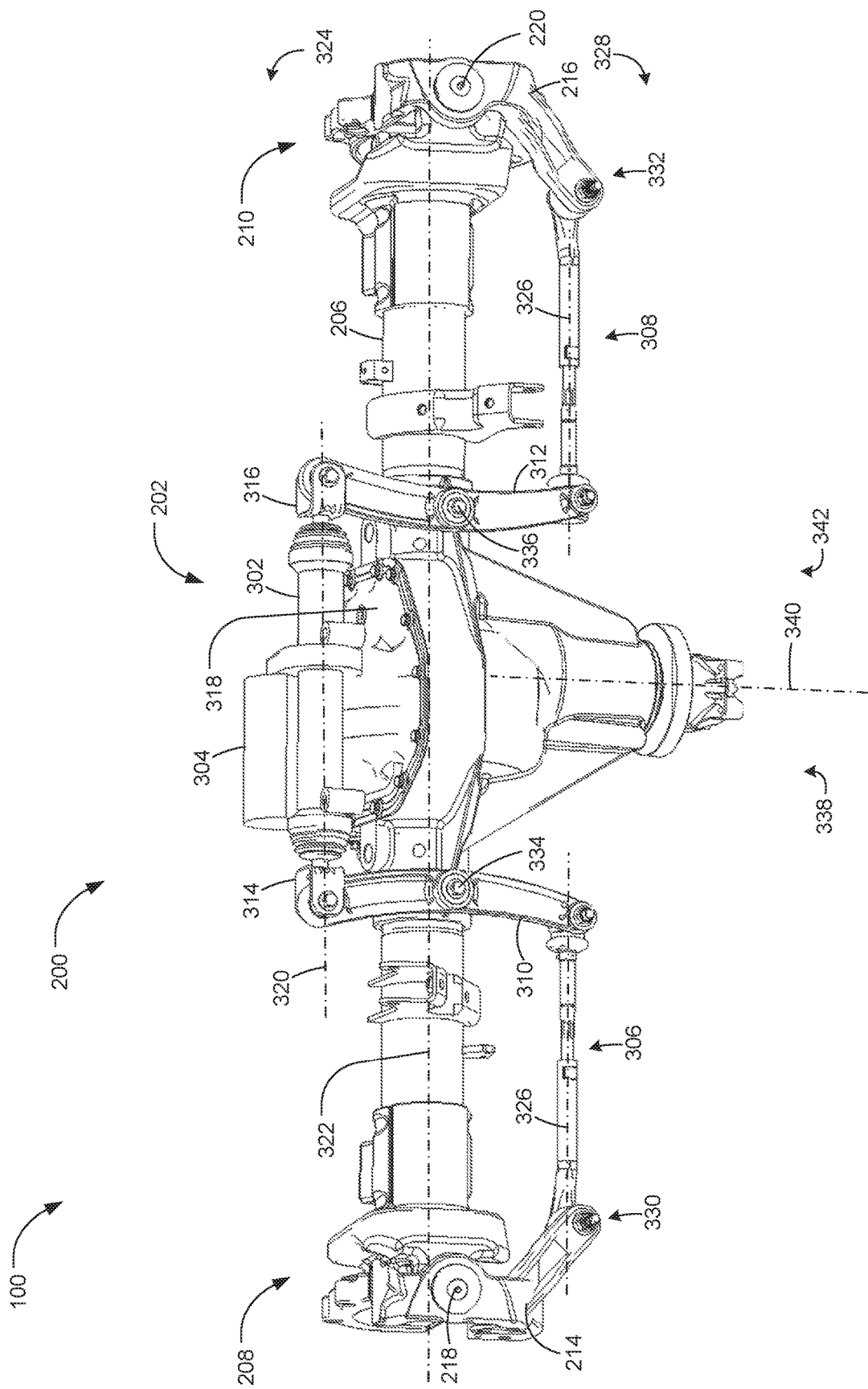
FIG. 3 is an assembled, perspective bottom view of an example axle and the example wheel steering apparatus of the example vehicle suspension of FIG. 2.

FIG. 3 is a perspective view of the rear axle 206 of FIG. 2. The steering apparatus 202 of the illustrated example includes a steering actuator 302 (e.g., a rack and pinion actuator) operated by a motor 304, outer tie rods 306, 308, transfer links 310, 312 (e.g., dual transfer links), and inner tie rods 314, 316. The outer tie rod 306, the inner tie rod 314 and the transfer link 310 are associated with and/or steer the left-side wheel assembly 208 and the outer tie rod 308, the inner tie rod 316 and the transfer link 312 are associated with and/or steer the right-side wheel assembly 210. The steering actuator 302 of the illustrated example is a rack and pinion actuator. In some examples, the steering actuator 302 can be a linear actuator, a hydraulic actuator, and/or any other actuator to generate linear or translational motion.

The outer tie rod 306 couples to the knuckle 214 and the outer tie rod 308 couples to the knuckle 216. The transfer link 310 couples the outer tie rod 306 to the steering actuator 302 via the inner tie rod 314 and the transfer link 312 couples the outer tie rod 308 to the steering actuator 302 via the inner tie rod 316. Thus, the outer tie rod 306, the transfer link 310, and the inner tie rod 314 of the steering apparatus 202 moves or pivots the knuckle 214 about the pivot 218, which turns the wheel assembly 208 and, thus, the rear wheel 106 during a steering event. The outer tie rod 308, the transfer link 312 and the inner tie rod 316 of the steering apparatus 202 moves or pivots the knuckle 216 about the pivot 220, which turns the wheel assembly 210 and, thus, the rear wheel 108 during a steering event.

The steering actuator 302 of the illustrated example is coupled or mounted to the rear axle 206. Specifically, the steering actuator 302 is coupled (e.g., mounted) to the rear axle 206 and/or the differential 212. In some examples, the steering actuator 302 couples or mounts to a rear surface 318 (e.g., a rear cover) of the differential 212 (e.g., a casing of the differential 212). The steering actuator 302 of the illustrated example has a longitudinal axis 320 that is substantially parallel relative to a longitudinal axis 322 of the rear axle 206. As used herein, the term "substantially" implies approximately rather than perfectly. Thus, the longitudinal axis 320 can be approximately parallel (e.g., within 5% tolerance) relative to the longitudinal axis 322 or perfectly parallel relative to the longitudinal axis 322. The steering actuator 302 of the illustrated example is positioned on a first side 324 of the longitudinal axis 322 of the rear axle 206. For example, the steering actuator 302 of the illustrated example is positioned aft of the longitudinal axis 322 and/or the rear axle 206 of the vehicle suspension 200.

Each of the outer tie rods 306, 308 of the illustrated example includes a longitudinal axis 326 that is substantially parallel relative to the longitudinal axis 322 of the rear axle 206 and/or the longitudinal axis 320 of the steering actuator 302. Thus, each longitudinal axis 326 can be approximately parallel (e.g., within 5% tolerance) relative to the longitudinal axis 322 and/or the longitudinal axis 320 or perfectly parallel relative to the longitudinal axis 322 and/or the longitudinal axis 320. The outer tie rods 306, 308 of the illustrated example are positioned on a second side 328 of the longitudinal axis 322 and/or the rear axle 206 opposite the first side 324. For example, the outer tie rods 306, 308 of the illustrated example are positioned fore of the rear axle 206 (e.g., towards the front wheels 102, 104 of the vehicle 100 of FIG. 1). As a result, the outer tie rod 306 couples to the knuckle 214 at a tie rod/knuckle interface 330 and the outer tie rod 308 couples to the knuckle 216 at a tie rod/knuckle interface 332 that are positioned on the second side 328 (e.g., fore) of the longitudinal axis 322 and/or the rear axle 206.

The transfer links 310, 312 transfer translational motion (e.g., linear movement) of the steering actuator 302 (e.g., directed along the longitudinal axis 320) aft of the rear axle 206 to rotational motion of the knuckles 214, 216 via the respective tie rod/knuckle interfaces 330, 332 positioned fore of the rear axle 206. The transfer links 310, 312 of the illustrated example extend across the rear axle 206 between the steering actuator 302 and the outer tie rods 306, 308. In other words, the transfer links 310, 312 of the illustrated example are non-parallel or substantially perpendicular relative to the longitudinal axis 320 of the steering actuator 302, the longitudinal axes 326 of the outer tie rods 306, 308 and/or the longitudinal axis 322 of the rear axle 206.

To transfer translational motion of the steering actuator 302 to translational motion of the outer tie rod 306 and, thus, rotational motion of the knuckle 214, the transfer link 310 is pivotally coupled to the rear axle 206 via a pivot 334. Similarly, to transfer translational motion of the steering actuator 302 to translational motion of the outer tie rod 308 and, thus, rotational motion of the knuckle 216, the transfer link 312 is pivotally coupled to the rear axle 206 via a pivot 336. The transfer links 310, 312 pivot or rotate about the respective pivots 334, 336 to transfer translational motion of the steering actuator 302 to translational motion of the respective outer tie rods 306, 308. The pivot 334 and/or the transfer link are positioned on a first side 338 of a centerline 340 of a drive shaft of the vehicle 100 and the pivot 336 and/or the transfer link 312 is positioned on a second side 342 of the centerline 340 of the drive shaft of the vehicle 100. As described in greater detail below, the steering actuator 302 positioned aft of the rear axle 206 and the tie rod/knuckle interfaces 330, 332 positioned fore of the rear axle 206 and coupled via the respective transfer links 310, 312 generates positive Ackermann. In some examples, the steering actuator 302 can be located fore of the rear axle 206 and the tie rod/knuckle interfaces 330, 332 and/or the outer tie rods 306, 308 can be located aft of the rear axle 206. In some examples, the steering actuator 302 can be located on a top side or bottom side of the rear axle 206 and the tie rod/knuckle interfaces 330, 332 and/or the outer tie rods 306, 308 can be located on the other one of the top side or bottom side.

FIG. 4 is an exploded view of the rear axle 206 of FIG. 2. The knuckle 214 of the illustrated example is coupled (e.g., mounted) to a first end 406 of the rear axle 206 to enable the rear wheel 106 to pivot relative to the rear axle 206. The knuckle 216 of the illustrated example is coupled (e.g., mounted) to the second end 408 of the rear axle 206 to enable the rear wheel 108 to pivot relative to the rear axle 206. Specifically, a yoke 410 couples the knuckle 214 to the first end 406 of the rear axle 206 (e.g., the axle tube 404) and a yoke 412 couples the knuckle 216 to a second end 408 of the rear axle 206 (e.g., the axle tube 404). The knuckle 214 of the illustrated example attaches to a knuckle-receiving portion 414 of the yoke 410 and the knuckle 216 of the illustrated example attaches to a knuckle-receiving portion 416 of the yoke 412. For example, each of the yokes 410, 412 of the illustrated example receives a ball joint 418 (e.g., a ball stud or fastener) and a ball joint 420 (e.g., a ball or fastener) to pivotally couple the knuckles 214, 216 to the respective yokes 410, 412.

The outer tie rods 306, 308 of the illustrated example couple the knuckles 214, 216 to the respective transfer links 310, 312. Each of the outer tie rods 306, 308 of the illustrated example includes a first tie rod end 422 and a second tie rod end 424 opposite the first tie rod end 422. The first tie rod end 422 of the outer tie rod 306 couples to the transfer link 310 and the second tie rod end 424 of the outer tie rod 306 couples to the knuckle 214. The first tie rod end 422 of the outer tie rod 308 couples to the transfer link 312 and the second tie rod end 424 of the outer tie rod 308 couples to the knuckle 216.

The first tie rod end 422 of each of the outer tie rods 306, 308 is defined by a first tie rod portion 426 and the second tie rod end 424 of each of the outer tie rods 306, 308 is defined by a second tie rod portion 428. In particular, the first tie rod portion 426 of the illustrated example is movable relative to the second tie rod portion 428 to adjust (e.g., increase or decrease) a length 430 of the outer tie rods 306, 308. Thus, the outer tie rods 306, 308 of the illustrated are adjustable. In some examples, the outer tie rods 306, 308 can be a unitary or non-adjustable body. Each of the first and second tie rod ends 422, 424 of the illustrated example includes a tie rod end boot 432 and a tie rod end fastener 434 (e.g., a threaded fastener, screw, bolt, shank, etc.). Each of the knuckles 214, 216 includes an arm 436 having an aperture to receive the respective tie rod end fasteners 434 of the second tie rod ends 424 of the outer tie rods 306, 308. Fasteners 438 couple (e.g., threadably couple) to the tie rod end fasteners 434 of the respective second tie rod end fasteners 434 to couple (e.g., attach) the outer tie rods 306, 308 to the respective knuckles 214, 216.

Each of the transfer links 310, 312 of the illustrated example includes a first end 440 and a second end 442 opposite the first end 440. The first end 440 of the transfer link 310 couples to the first tie rod end 422 of the outer tie rod 306 and the second end 442 of the transfer link 312 couples to the inner tie rod 314. Similarly, the first end 440 of the transfer link 312 couples to the first tie rod end 422 of the outer tie rod 308 and the second end 442 of the transfer link 312 couples to the inner tie rod 316.

Each of the first ends 440 of the respective transfer links 310, 312 defines an opening 444 and each of the second ends 442 of the respective transfer links 310, 312 defines an opening 446. Specifically, the opening 444 of the transfer link 310 receives the tie rod end fastener 434 of the outer tie rod 306 and the opening 444 of the transfer link 312 receives the tie rod end fastener 434 of the outer tie rod 308. Fasteners 438 (e.g., nuts) couple (e.g., attach or mount) the first tie rod ends 422 to the respective first ends 440 of the outer tie rods 306, 308 to the first ends 440 of the transfer links 310, 312. Each of the openings 446 includes or receives a bearing 448 to enable rotation or pivotal motion between the second ends 442 of the transfer links 310, 312 and the respective inner tie rods 314, 316. Additionally, each of the transfer links 310, 312 of the illustrated example includes an opening 450 positioned between the first end 440 and the second end 442 that is to receive a fastener 452. The fasteners 452 couple the respective transfer links 310, 312 to the rear axle 206 and/or the axle tube 404. To enable the transfer links 310, 312 to pivot relative to the rear axle 206 about the respective pivots 334, 336 (FIG. 3), the openings 450 of the transfer links 310, 312 include bearings 454.

Each of the inner tie rods 314, 316 include a rod 456 coupled to the steering actuator 302 (e.g., a rack gear of the steering actuator 302) at a first end and a coupler 458 (e.g., a clevis yoke) at a second end. The couplers 458 of the inner tie rods 314, 316 receive the respective second ends 442 of the transfer links 310, 312. Fasteners 460 (e.g., screws, pins, etc.) attach the couplers 458 to the bearings 448 positioned in the openings 446 of the second ends 442 of the transfer links 310, 312.

The steering actuator of the illustrated example is coupled to the rear axle. Specifically, the steering actuator positioned on a first side of a rear axle. The steering actuator is positioned aft of the rear axle 206. For example, the steering actuator of the illustrated example is coupled (e.g., mounted or attached) to the axle tube 204a (e.g., an outer structure of the axle 206) and/or to a cover or casing of the differential. A longitudinal axis of the steering actuator is offset relative to (e.g., located aft of) the rear axle. the longitudinal axis.

Figure 5:
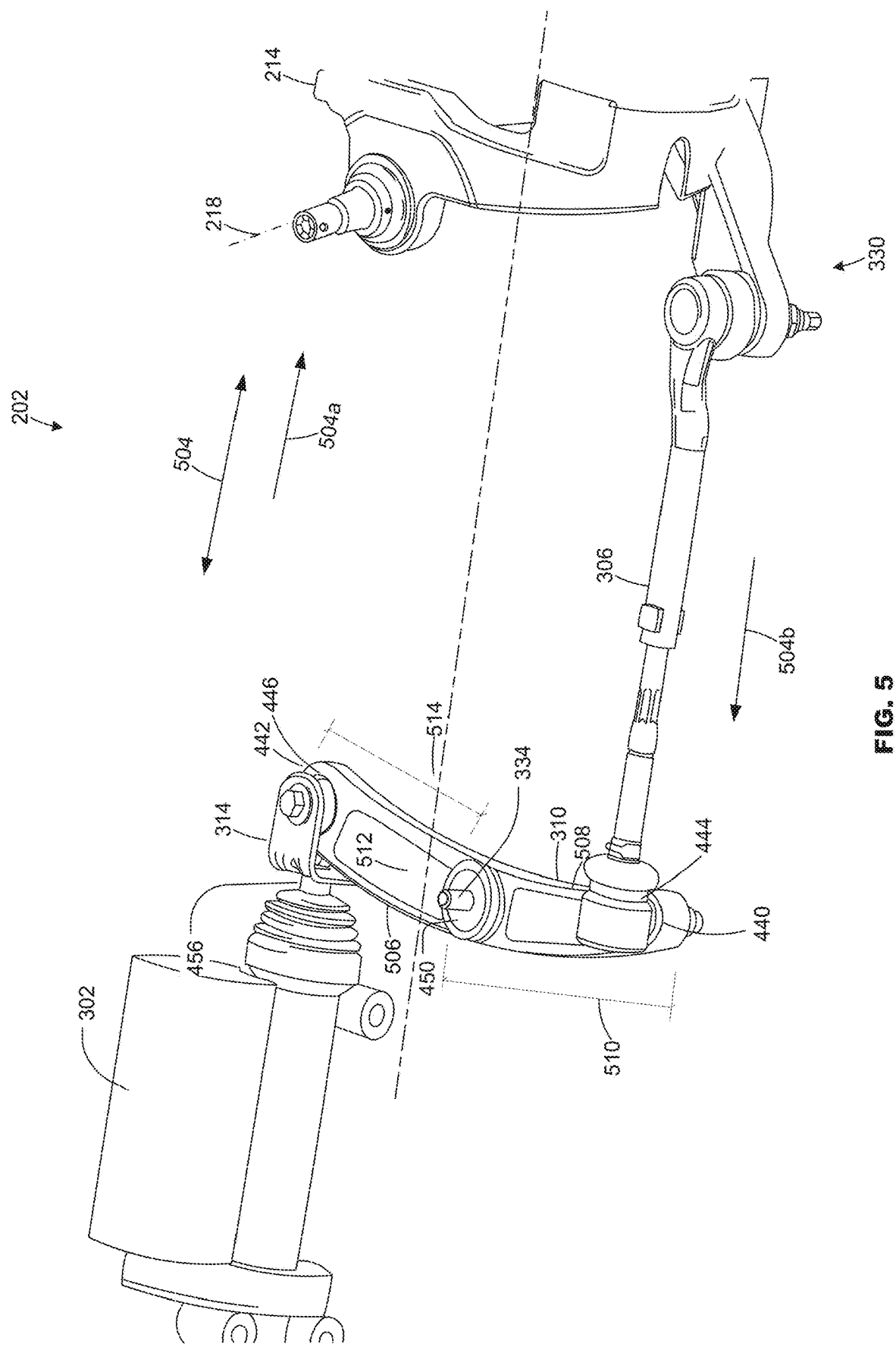
FIG. 5 is a partial, perspective front view of the example wheel steering apparatus of FIGS. 2-4.

FIG. 5 is an enlarged, partial perspective view of the steering apparatus 202 of FIGS. 2-3. FIG. 5 shows components of a left-side (e.g., a rear driver side) of the steering apparatus 202 of FIGS. 2-4 of FIG. 2, but it will be appreciated that similar components, configured for the right-side of the steering apparatus 202, would be provided to form a full suspension as shown, for example, in FIGS. 2-4. For clarity, the rear axle 206 is not shown in FIG. 5. The rod 456 of the inner tie rod 314 is movable (e.g., slidably movable) relative to a housing 502 of the steering actuator 302. Thus, as the rod 456 moves in a rectilinear direction 504 via the steering actuator 302, the transfer link 310 pivots or rotates relative to the rear axle 206 about the pivot 334 to cause the outer tie rod 306 to move in the rectilinear direction 504, which in turn causes the knuckle 214 rotate about the pivot 218.

Due to space constraints under the vehicle 100 when the vehicle suspension 200 is coupled to the vehicle 100, the transfer link 310 of the illustrated example includes a body 506 having an arcuate or curved shape or profile. However, in some examples, the body 506 and/or the transfer links 310, 312 may have a substantially straight (e.g., non-curved) profile and/or any other geometric profile suitable for transferring motion from the steering actuator 302 to the outer tie rods 306, 308. The body 506 of the illustrated example has a first portion 508 defining a first length 510 between the opening 444 and/or the first end 440 and a second portion 512 defining a second length 514 between the opening 446 and/or the second end 442. The opening 450 of the illustrated example is positioned between the openings 444 and 446. The opening 450 and, thus, the pivot 334 of the illustrated example is positioned or located at a midpoint between the first end 440 and the second end 442. In some examples, the opening 450 and/or the pivot 334 can be located closer to the opening 444 and/or the first end 440, or closer to the opening 446 and/or the second end 442. The body 506 of the illustrated example has an arched geometric shape.

In some examples, a curvature of the body 506 and/or a location of the pivot 334 between the first end 440 and the second end 442 can amplify or increase a translational distance of the outer tie rod 306 relative to a translational distance of the inner tie rod 314. For example, when the steering actuator 302 causes the inner tie rod 314 to move a first distance (e.g., one inch) in a first rectilinear direction 504a, the transfer link 310 may cause the outer tie rod 306 to move a second distance (e.g., an inch and a half) in a second rectilinear direction 504b that is greater than the first distance, and vice versa. Such configuration of the transfer link 310 enables the inner tie rod 314 to be smaller (e.g., shorter in length in the longitudinal direction) that would otherwise be required to move the outer tie rod 306 to pivot or rotate the knuckle 214 to a desired rotational position.

Figure 6:
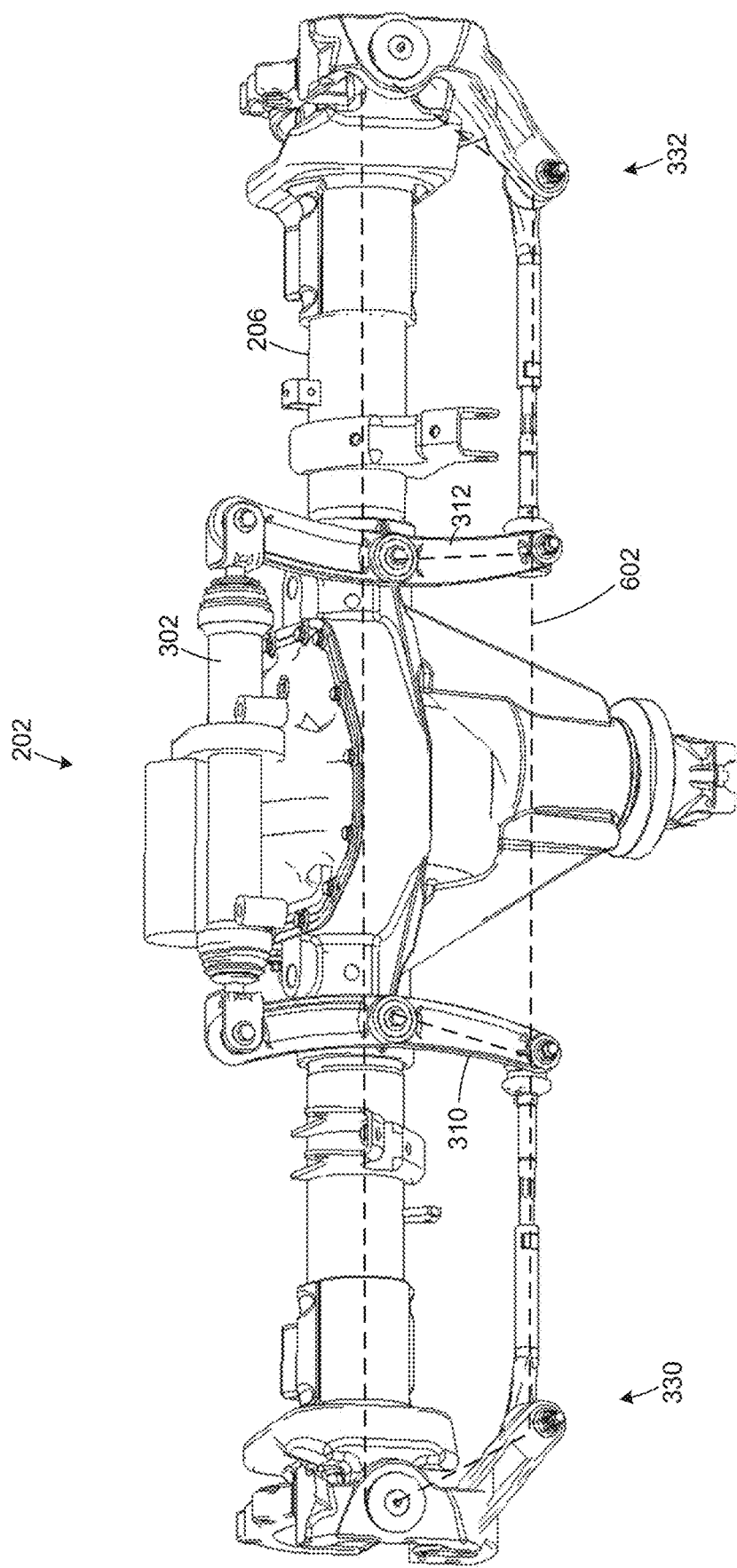
FIG. 6 is a perspective view of the example axle and wheel steering apparatus of FIGS. 2-5.

FIG. 6 is a bottom, perspective view of the example vehicle suspension 200 of FIGS. 2-5. Referring to FIG. 6, the steering apparatus 202 of the illustrated example generates positive Ackermann. Specifically, the steering apparatus 202 forms an approximate parallelogram 602 illustrated in dashed lines, which skews to one side as the rear wheels 106, 108 (FIG. 1) turn during a turning event. As a result, an inside wheel (e.g., the rear wheel 106 and/or wheel assembly 208) can be positioned at a steering angle (e.g., toe angle about the pivot 218) that is greater than a steering angle (e.g., a toe angle about the pivot 220) of an outside wheel (e.g., the rear wheel 108 and/or the wheel assembly 210) during a turning event, allowing the inside wheel to steer at a tighter radius. The positive rear Ackermann generated by the steering apparatus 202 can be varied (e.g., increased or decreased) by adjusting (e.g., increasing or decreasing) the dimensional characteristics (e.g., lengths, profiles, shapes, etc.) of the outer tie rods 306, 308, the inner tie rods 314, 316, the transfer links 310, 312, the arms 436 of the knuckles 214, 216 and/or any other dimensional envelope of the steering apparatus 202. In some examples, a dimensional characteristic (e.g., a shape, a curvature, a length, etc.) of the transfer links 310, 312 can be varied to achieve different amounts of positive rear Ackermann. For example, the transfer links 310, 312 can have a substantially straight (e.g., non-curved) profile. For example, a tie rod having a length that is greater than a length of the outer tie rod 306 can be employed to vary (e.g., increase or decrease) rear Ackermann. For example, an inner tie rod and/or a transfer link having a length that is greater than a length of respective the inner tie rod 314 and/or the transfer link 312 can be employed to vary (e.g., increase or decrease) rear Ackermann. In other words, adjusting or modifying a dimensional characteristic of the parallelogram 602 varies (e.g., increases or decreases) an amount of positive rear Ackermann performance provided by the steering apparatus 202 and/or the vehicle 100.

As noted above, the steering apparatus 202 of the illustrated example generates positive rear Ackermann by placing the steering actuator 302 on a first side (e.g., aft) of the rear axle 206 and the tie rod/knuckle interfaces 330, 332 on a second side (e.g., fore) of the rear axle 206. Specifically, the transfer links 310, 312 enable such configuration. Unlike known rear wheel steering apparatus, the steering apparatus 202 of the illustrated example enables an inner wheel (e.g., the rear wheel 106) to move at a greater toe-out angle (e.g., to cut more) than a toe-in angle of an outer wheel (e.g., the rear wheel 108) during a turning event (e.g., a left turn event), thereby producing positive rear Ackermann (e.g., 40 percent rear Ackermann).

Figure 7:
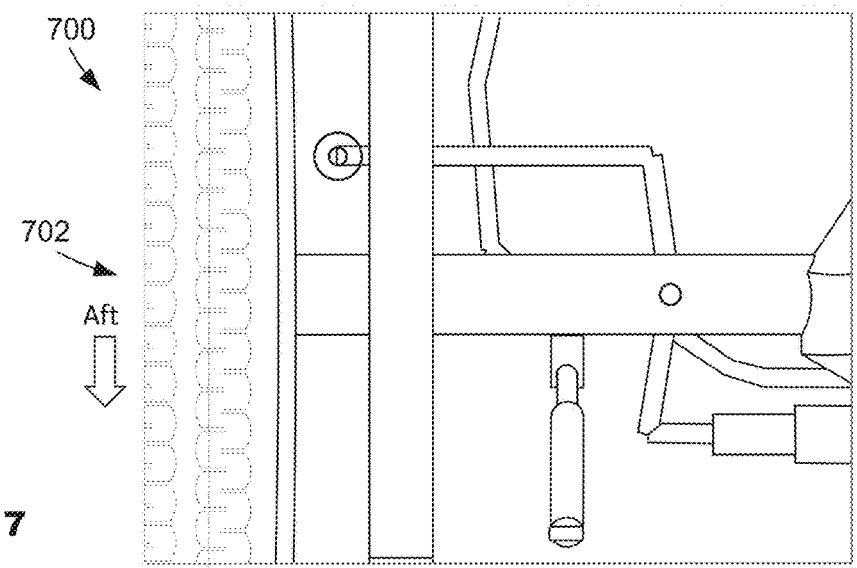
FIG. 7 is a top, schematic view of a rear wheel of the example vehicle and the example wheel steering apparatus of FIGS. 1-6 showing the rear wheel in a straight position.
Figure 8:
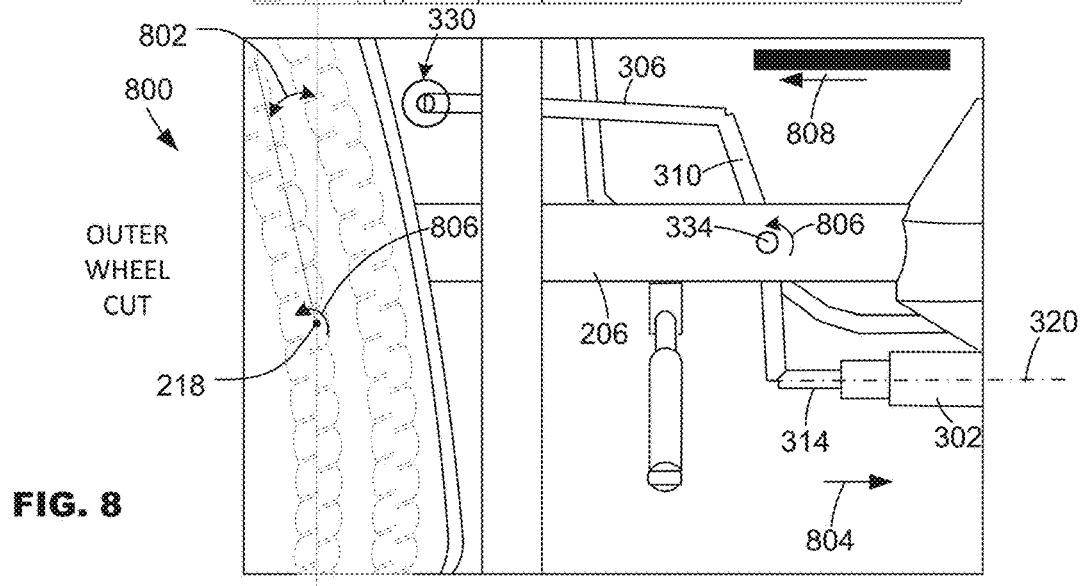
FIG. 8 is a top, schematic view of the rear wheel of the example vehicle and the example wheel steering apparatus of FIGS. 1-6 showing the rear wheel at a first steering angle.
Figure 9:
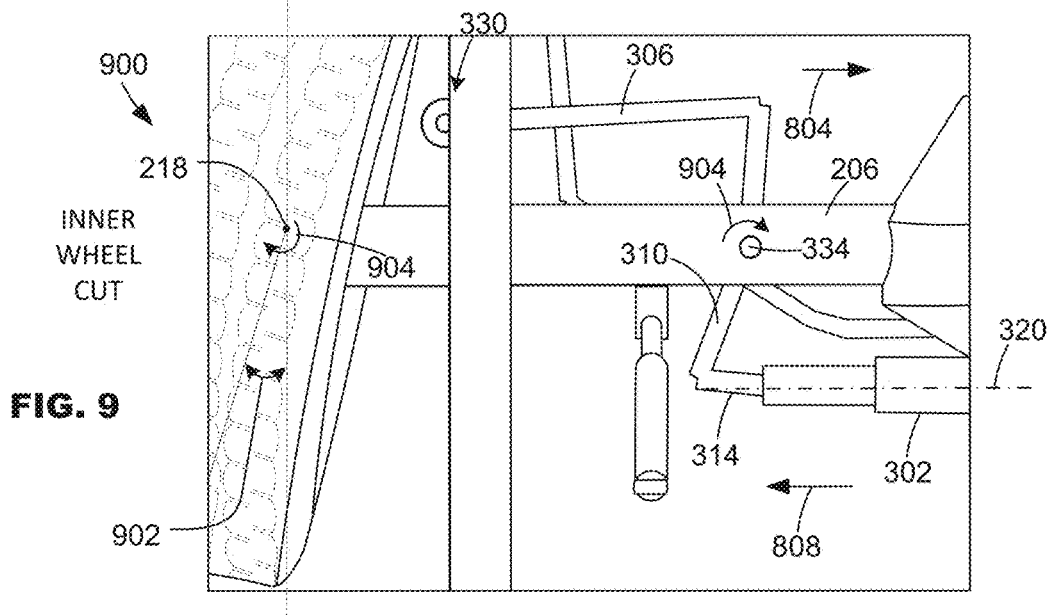
FIG. 9 is a top, schematic view of the rear wheel of the example vehicle and the example wheel steering apparatus of FIGS. 1-6 showing the rear wheel at a second steering angle.

FIGS. 7-9 are top, schematic illustrations of the rear wheel 106 and the vehicle suspension 200 of FIGS. 2-6. FIG. 7 illustrates the rear wheel 106 positioned in a straight position 700. To position the rear wheel 106 in the straight position 700, the steering actuator 302 is in a first position 702 (e.g., an initial position).

FIG. 8 illustrates the rear wheel 106 positioned at an outer wheel cut position 800 having a first steering angle 802 (e.g., a toe angle or toe-out configuration). To position the rear wheel 106 at the first steering angle 802, the steering actuator 302 causes the inner tie rod 314 (e.g., the rod 456) to move in a first linear direction 804 along the longitudinal axis 320. In turn, the transfer link 310 pivots about the pivot 334 in a first rotational direction 806 (e.g., a counter clockwise direction in the orientation of FIG. 8) and causes the outer tie rod 306 to move in a second linear direction 808 opposite the first linear direction 804. In turn, the outer tie rod 306 causes the wheel assembly 208 and, thus, the rear wheel 106 to rotate about the pivot 218 in the first rotational direction 806 in the orientation of FIG. 8 to the first steering angle 802.

FIG. 9 illustrates the rear wheel 106 positioned at an inner wheel cut position 900 having a second steering angle 902 (e.g., a toe angle or toe-in configuration). To position the rear wheel 106 at the second steering angle 902, the steering actuator 302 causes the inner tie rod 314 (e.g., the rod 456) to move in the second linear direction 808 along the longitudinal axis 320. In turn, the transfer link 310 pivots about the pivot 334 in a second rotational direction 904 (e.g., a clockwise direction in the orientation of FIG. 9) and causes the outer tie rod 306 to move in the first linear direction 804 opposite the second linear direction 808. In turn, the outer tie rod 306 causes the wheel assembly 208 and, thus, the rear wheel 106 to rotate about the pivot 218 in the second rotational direction 904 in the orientation of FIG. 9 to the second steering angle 902.

Front wheel Ackermann is often tracked at a 20-degree front wheel cut angle (e.g., 20-degree toe angle). In some examples, with front Ackermann tracked at a 20-degree front wheel cut angle, the steering apparatus 202 of the illustrated example can generate positive rear Ackermann when the rear wheel steering angle (e.g., the first steering angle 802 and/or the second steering angle 902) is greater than approximately between 2 and 5 degrees. Additionally, in some such examples, positive rear Ackermann generated by the steering apparatus 202 increases (e.g., linearly, non-linearly, etc.) with increasing rear wheel steering angles (e.g., increasing the steering angles 802 and/or 902). For example, at a 20-degree front wheel cut angle, the steering apparatus 202 of the illustrated example can generate positive rear Ackermann between approximately 20 percent and 50 percent when the rear wheel steering angle (e.g., the first steering angle 802 and/or the second steering angle 902) increases between approximately 5 degrees and 9 degrees. Thus, in such an example, positive rear Ackermann increases as the rear wheel steering angle increases. In some examples, when the front wheels 102, 104 are at a full wheel out position (e.g., the front wheels 102, 104 are at full wheel cut angle or full-lock position), the steering apparatus 202 can produce or generate positive rear Ackerman of between approximately 35 percent and 60 percent when the rear wheel steering angle (e.g., the first steering angle 802 or the second steering angle 902) is between approximately 9 degrees and 12 degrees.

In contrast with known steering assemblies (e.g., the outer tie rods, the inner tie rods, the steering actuator, etc.) of rear wheel steer on solid axles that are positioned on one side (e.g., aft) of a rear axle generate negative rear Ackermann of approximately 40 percent for front wheel Ackermann tracked at 20-degrees. Additionally, such known systems generate decreasing rear Ackermann with increased wheel cut angles. For example, for front wheel Ackermann tracked at 20-degree front wheel cut angle, rear Ackermann generated by known steering assemblies positioned on a solid axle generate between approximately negative 40 percent and negative 60 percent for rear wheel steering angles of between approximately 5 degrees and 9 degrees. Similarly, with the front wheels at full lock, known rear steering assemblies positioned on solid axles produce negative rear Ackermann of between approximately negative 20 percent and negative 40 percent for rear wheel steering angles of between approximately 3 degrees and 12 degrees. Such negative rear Ackermann is generated when the rear wheel steer on a solid axle (e.g., a steering actuator and tie rod/knuckle interface) is positioned aft of the rear axle. On the contrary, the steering apparatus 202 of the illustrated example significantly improves vehicle handling and performance.

Figure 10A:
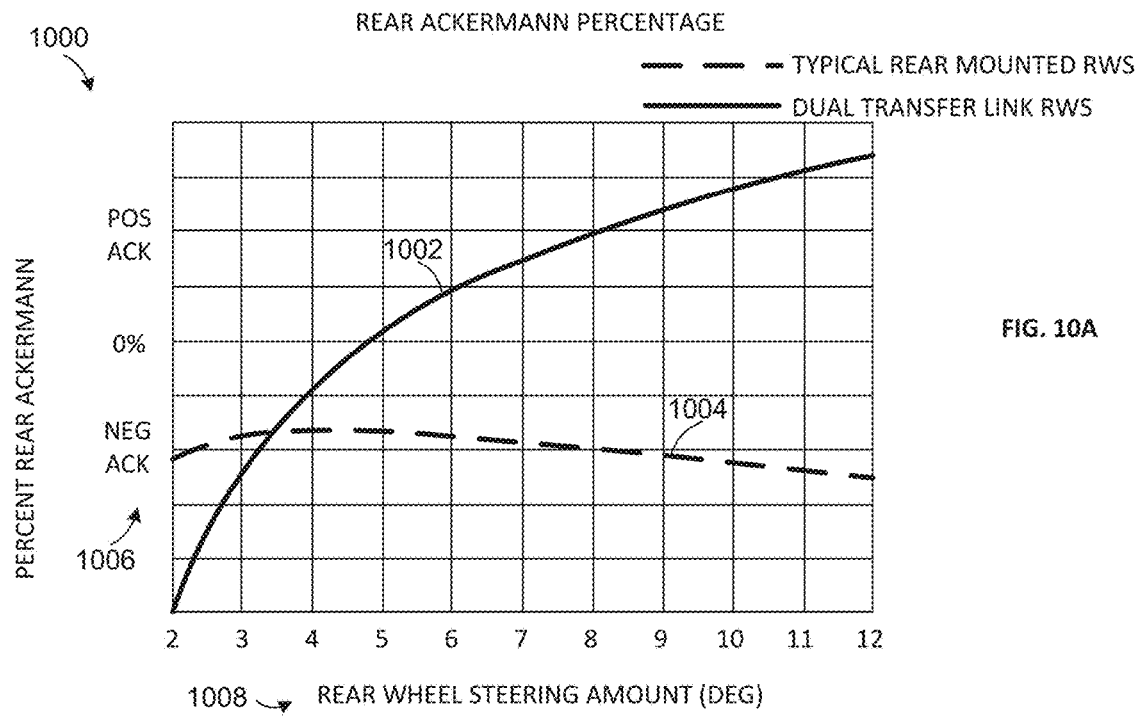
FIGS. 10A and 10B illustrate graphs representative of rear Ackermann produced by example wheel steering apparatus and/or the suspension apparatus disclosed herein.
Figure 10B:
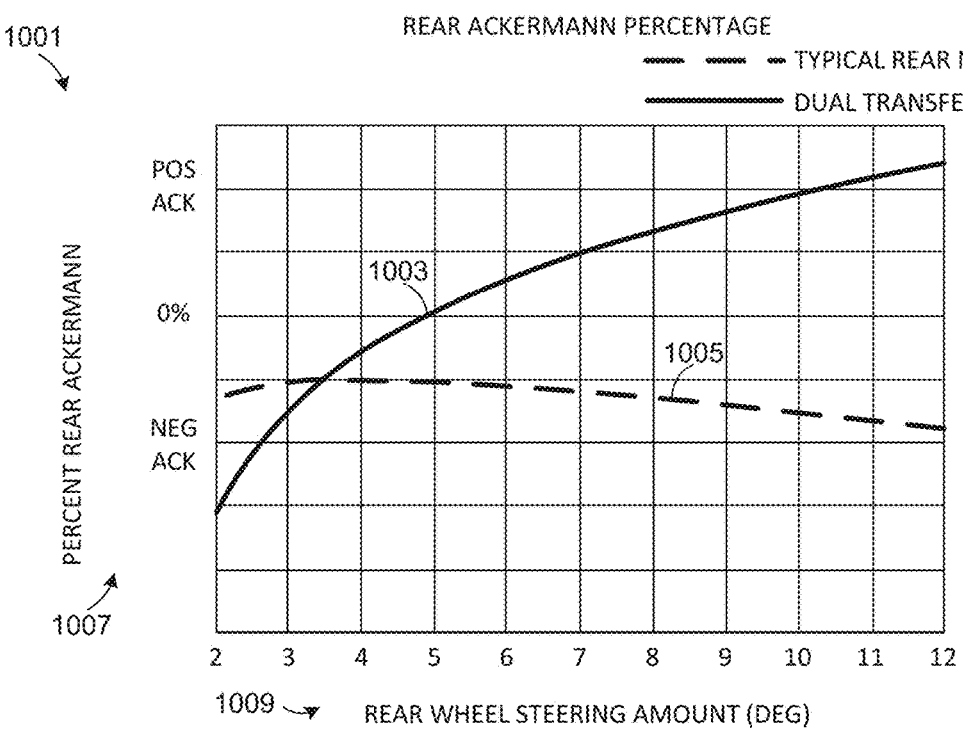

FIGS. 10A and 10B illustrate graphs 1000 and 1001 representative of rear Ackermann produced by the example steering apparatus 202 and/or the suspension apparatus 200 disclosed herein. FIG. 10A illustrates a graph 1000 of rear Ackermann percentage based on a first front wheel Ackermann (e.g., a front wheel Ackermann tracked at 20-degree front wheel cut angle, a front wheel Ackermann tracked at 40-degree front wheel cut angle, etc.). Specifically, the graph 1000 includes a first line 1002 representative of rear Ackermann provided by the dual transfer links 310, 312 disclosed herein and a second line 1004 representative of rear Ackermann provided by a conventional rear steering assembly (e.g., that does not employ the dual transfer links 310, 312). A percent of rear Ackermann 1006 is represented by the y-axis and a degree of rear wheel steering 1008 (e.g., a cut-angle) is represented by the x-axis. As shown in FIG. 10A, the percent of rear Ackermann 1006 provided by the steering apparatus 202 that is represented by the first line 1002 increases (e.g., non-linearly) with an increase in the degree of rear wheel steering 1008. On the contrary, the percent of rear Ackermann 1006 provided by the conventional steering and/or suspension systems that is represented by the second line 1004 decreases with an increase in the degree of rear wheel steering 1008.

FIG. 10B illustrates a graph 1001 of rear Ackermann percentage based on a second front wheel Ackermann (e.g., the front wheels at full lock, etc.). Specifically, the graph 1001 includes a first line 1003 representative of rear Ackermann provided by the dual transfer links 310, 312 disclosed herein and a second line 1005 representative of rear Ackermann provided by a conventional rear steering assembly (e.g., that does not employ the dual transfer links 310, 312). A percent of rear Ackermann 1007 is represented by the y-axis and a degree of rear wheel steering 1009 (e.g., a cut-angle) is represented by the x-axis. As shown in FIG. 10B, the percent of rear Ackermann 1007 provided by the steering apparatus 202 that is represented by the first line 1003 increases (e.g., non-linearly) with an increase in the degree of rear wheel steering 1009. On the contrary, the percent of rear Ackermann 1007 provided by the conventional steering and/or suspension systems that is represented by the second line 1005 decreases with an increase in the degree of rear wheel steering 1009.

Figure 11:
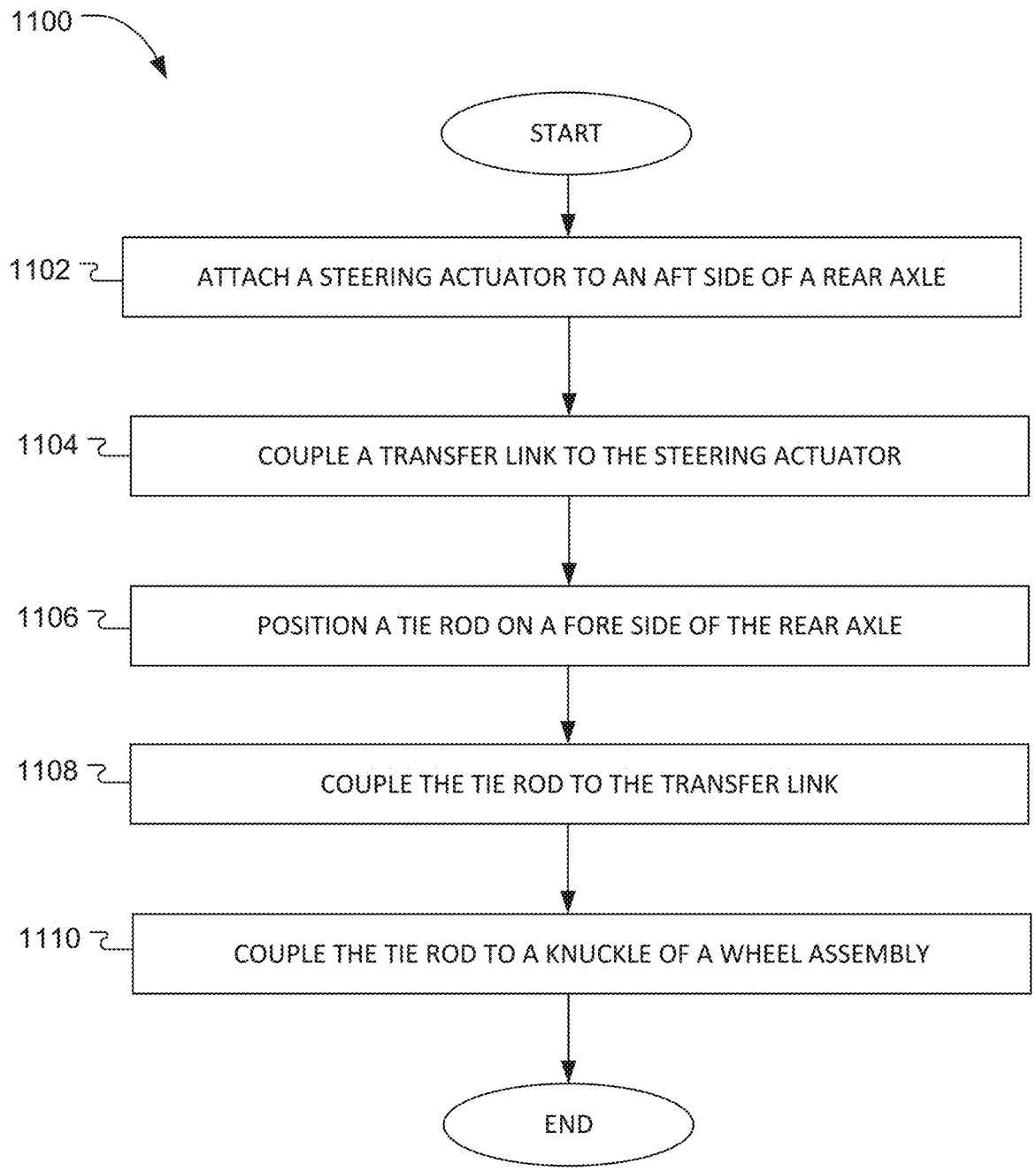
FIG. 11 is a flowchart of an example method of assembling an example steering apparatus disclosed herein to a vehicle.

FIG. 11 illustrates an example method 1100 that may be used to assemble an example steering apparatus disclosed herein such as the steering apparatus 202 of FIGS. 1-9 to a vehicle such as the vehicle 100 of FIG. 1. While an example manner of assembling the steering apparatus 202 has been illustrated in FIG. 11, one or more of the steps and/or processes illustrated in FIG. 11 may be combined, divided, re-arranged, omitted, eliminated, modified and/or implemented in any other way. Further still, the example method of FIG. 11 may include one or more processes and/or steps in addition to, or instead of, those illustrated in FIG. 11 and/or may include more than one of any or all of the illustrated processes and/or steps. Further, although the example method is described with reference to the flowchart illustrated in FIG. 11, many other methods of assembling the steering apparatus 202 may alternatively be used.

Referring to FIG. 11, the example method 1100 disclosed herein may begin by attaching a steering actuator 302 to an aft side of the rear axle 206 (block 1102). For example, the steering actuator 302 may be coupled to the rear surface 318 of the differential 212 and/or the axle tube 404 via fasteners such as, for example bolts, screws, etc. In some examples, the steering actuator 302 may be welded to the axle tube 404 and/or the rear surface 318.

The transfer link 310 is coupled to the steering actuator 302 (block 1104). For example, the second end 442 of the transfer link 310 is coupled to the inner tie rod 314, which is attached to the steering actuator 302. The second end 442 of the transfer link 310 may be attached to the coupler 458 of the inner tie rod 314 via the fasteners 460. The coupler 458 is attached (e.g., welded) to the steering actuator 302 via the rod 456.

The outer tie rod 306 is then positioned on a fore side of the rear axle 206 (block 1006). The outer tie rod 306 is coupled to the transfer link 310 (block 1108). For example, the first tie rod end 422 of the outer tie rod 306 is coupled to the first end 440 of the transfer link 310 via the tie rod end fastener 434 and a nut that secures (e.g., threads) to the tie rod end fastener 434. The outer tie rod 306 is coupled to the knuckle 214 of the wheel assembly 208 (block 1110). For example, the second tie rod end 424 of the outer tie rod 306 is positioned in the aperture of the arm 436 of the knuckle 214 and the fastener 438 is secured (e.g., threaded) to the tie rod end fastener 434 at the second tie rod end 424 of the outer tie rod 306. The method 1100 shown in blocks 1102-1110 can be applied to couple the inner tie rod 316, the transfer link 312, the outer tie rod 308 and the knuckle 216.

The following paragraphs provide various examples of the examples disclosed herein.

Example 1 can be a steering actuator to couple to a rear axle, a tie rod, and a transfer link to couple the steering actuator and the tie rod. The steering actuator is positioned on a first side of a first longitudinal axis of the rear axle and the tie rod positioned on a second side of the first longitudinal axis of the rear axle opposite the first side.

Example 2 includes the steering apparatus of example 1, wherein the tie rod includes a first end and a second end opposite the first end, the first end is to couple to a first end of the transfer link and the second end is to couple to a knuckle of the vehicle.

Example 3 includes the steering apparatus of any one of examples 1-2, wherein a tie rod-knuckle interface is positioned on the second side of the first longitudinal axis.

Example 4 includes the steering apparatus of any one of examples 1-3, wherein the transfer link includes a second end opposite the first end, the second end of the transfer link to couple to the steering actuator.

Example 5 includes the steering apparatus of any one of examples 1-4, wherein the transfer link includes a second longitudinal axis, the second longitudinal axis being non-parallel relative to the first longitudinal axis when the transfer link is coupled to the steering actuator and the tie rod.

Example 6 includes the steering apparatus of any one of examples 1-5, wherein the second longitudinal axis is perpendicular relative to the first longitudinal axis.

Example 7 includes the steering apparatus of any one of examples 1-6, wherein the transfer link has a curved profile between the first end and the second end.

Example 8 includes the steering apparatus of any one of examples 1-7, wherein the first side is aft of the rear axle and the second side is fore of the rear axle.

Example 9 includes the steering apparatus of any one of examples 1-8, wherein the transfer link is pivotally coupled to a housing of the rear axle.

Example 10 can be a steering apparatus including a rear axle having a differential positioned between a first end of the rear axle and a second end of the rear axle opposite the first end. A first knuckle coupled to the first end of the rear axle to enable a first wheel to pivot relative to the rear axle. A steering rack positioned aft of the rear axle. A first tie rod positioned fore of the rear axle, the first tie rod coupled to the first knuckle. A first transfer link to couple the first tie rod and the steering rack, the first transfer link being pivotally coupled to the rear axle.

Example 11 includes the steering apparatus of example 10, wherein the first tie rod includes a first end coupled to the first knuckle and a second end opposite the first end coupled to a first end of the first transfer link.

Example 12 includes the steering apparatus of any one of examples 10-11, wherein the first transfer link includes a second end opposite the first end, the second end of the first transfer link being coupled to a first end of the steering rack.

Example 13 includes the steering apparatus of any one of examples 10-12, wherein the first end of the first transfer link is positioned fore of the rear axle and the second end of the first transfer link is positioned aft of the rear axle.

Example 14 includes the steering apparatus of any one of examples 10-13, further including a second knuckle coupled to the second end of the rear axle to enable a second wheel to pivot relative to the rear axle. A second tie rod positioned fore of the rear axle, the second tie rod coupled to the second knuckle. A second transfer link to couple the second tie rod and the steering rack, the second transfer link being pivotally coupled to the rear axle.

Example 15 includes the steering apparatus of any one of examples 10-14, wherein the second tie rod includes a first end coupled to the second knuckle and a second end opposite the first end coupled to a first end of the second transfer link.

Example 16 includes the steering apparatus of any one of examples 10-15, wherein the second transfer link includes a second end opposite the first end, the second end of the second transfer link being coupled to a second end of the steering rack opposite the first end of the steering rack.

Example 17 includes the steering apparatus of any one of examples 10-16, wherein the first end of the second transfer link is positioned fore of the rear axle and the second end of the second transfer link is positioned aft of the rear axle.

Example 18 can be a method including attaching a steering actuator to an aft side of a rear axle; coupling a transfer link to the steering actuator; positioning a tie rod on a fore side of the rear axle; coupling a first end of the tie rod to the transfer link; and coupling a second end of the tie rod to a knuckle of a wheel assembly supported at a first end of the rear axle, the tie rod and knuckle to define a tie rod/knuckle interface positioned fore of the rear axle.

Example 19 includes the method of example 18, further including pivotally attaching the transfer link to the rear axle to enable the transfer link to pivot about a pivot point relative to the rear axle.

Example 20 includes the method of any one of examples 18-19, further including attaching a first end of the transfer link to the first end of the tie rod and attaching a second end of the transfer link opposite the first end to the steering actuator, wherein the pivot point is positioned between the first end of the transfer link and the second end of the transfer link.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A steering apparatus comprising:
   a steering actuator to couple to a rear axle of a vehicle;
   a tie rod; and
   a transfer link to couple the steering actuator and the tie rod, the transfer link positioned closer to a centerline of a driveshaft of the vehicle than to a knuckle of the vehicle, the steering actuator positioned on a first side of a first longitudinal axis of the rear axle and the tie rod positioned on a second side of the first longitudinal axis of the rear axle opposite the first side.

2. The steering apparatus of claim 1, wherein the tie rod includes a first end and a second end opposite the first end, the first end is to couple to a first end of the transfer link and the second end is to couple to the knuckle of the vehicle.

3. The steering apparatus of claim 2, wherein a tie rod-knuckle interface is positioned on the second side of the first longitudinal axis.

4. The steering apparatus of claim 2, wherein the transfer link includes a second end opposite the first end, the second end of the transfer link to couple to the steering actuator.

5. The steering apparatus of claim 4, wherein the transfer link includes a second longitudinal axis, the second longitudinal axis being non-parallel relative to the first longitudinal axis when the transfer link is coupled to the steering actuator and the tie rod.

6. The steering apparatus of claim 5, wherein the second longitudinal axis is perpendicular relative to the first longitudinal axis.

7. The steering apparatus of claim 4, wherein the transfer link has a curved profile between the first end and the second end.

8. The steering apparatus of claim 2, wherein the first side is aft of the rear axle and the second side is fore of the rear axle.

9. The steering apparatus of claim 1, wherein the transfer link is pivotally coupled to a housing of the rear axle.

10. The steering apparatus of claim 1, wherein the transfer link is positioned between the tie rod and the centerline of the driveshaft of the vehicle.

11. A steering apparatus comprising:
    a rear axle having a differential positioned between a first end of the rear axle and a second end of the rear axle opposite the first end;
    a first knuckle coupled to the first end of the rear axle to enable a first wheel to pivot relative to the rear axle;
    a steering rack positioned aft of the rear axle;
    a first tie rod positioned fore of the rear axle, the first tie rod coupled to the first knuckle;
    a first transfer link to couple the first tie rod and the steering rack, the first transfer link being pivotally coupled to the rear axle;
    a second knuckle coupled to the second end of the rear axle to enable a second wheel to pivot relative to the rear axle;
    a second tie rod positioned fore of the rear axle, the second tie rod coupled to the second knuckle; and
    a second transfer link to couple the second tie rod and the steering rack, the second transfer link being pivotally coupled to the rear axle.

12. The steering apparatus of claim 11, wherein the first tie rod includes a first end coupled to the first knuckle and a second end opposite the first end coupled to a first end of the first transfer link.

13. The steering apparatus of claim 12, wherein the first transfer link includes a second end opposite the first end, the second end of the first transfer link being coupled to a first end of the steering rack.

14. The steering apparatus of claim 13, wherein the first end of the first transfer link is positioned fore of the rear axle and the second end of the first transfer link is positioned aft of the rear axle.

15. The steering apparatus of claim 11, wherein the second tie rod includes a first end coupled to the second knuckle and a second end opposite the first end coupled to a first end of the second transfer link.

16. The steering apparatus of claim 15, wherein the second transfer link includes a second end opposite the first end, the second end of the second transfer link being coupled to a second end of the steering rack opposite the first end of the steering rack.

17. The steering apparatus of claim 16, wherein the first end of the second transfer link is positioned fore of the rear axle and the second end of the second transfer link is positioned aft of the rear axle.

18. A method comprising:
attaching a steering actuator to an aft side of a rear axle;
positioning a tie rod on a fore side of the rear axle;
positioning a transfer link closer to a centerline of a drive shaft of a vehicle than to a knuckle of a wheel assembly supported at a first end of the rear axle;
coupling a first end of the tie rod to the transfer link; and
coupling a second end of the tie rod to the knuckle, the tie rod and knuckle to define a tie rod/knuckle interface positioned fore of the rear axle.

19. The method of claim 18, further including pivotally attaching the transfer link to the rear axle to enable the transfer link to pivot about a pivot point relative to the rear axle.

20. The method of claim 19, further including attaching a first end of the transfer link to the first end of the tie rod and attaching a second end of the transfer link opposite the first end to the steering actuator, wherein the pivot point is positioned between the first end of the transfer link and the second end of the transfer link.

* * * * *